Jan. 26, 1954
J. C. MUNDAY
2,667,448
HANDLING FINELY DIVIDED SOLIDS
Original Filed Oct. 28, 1942
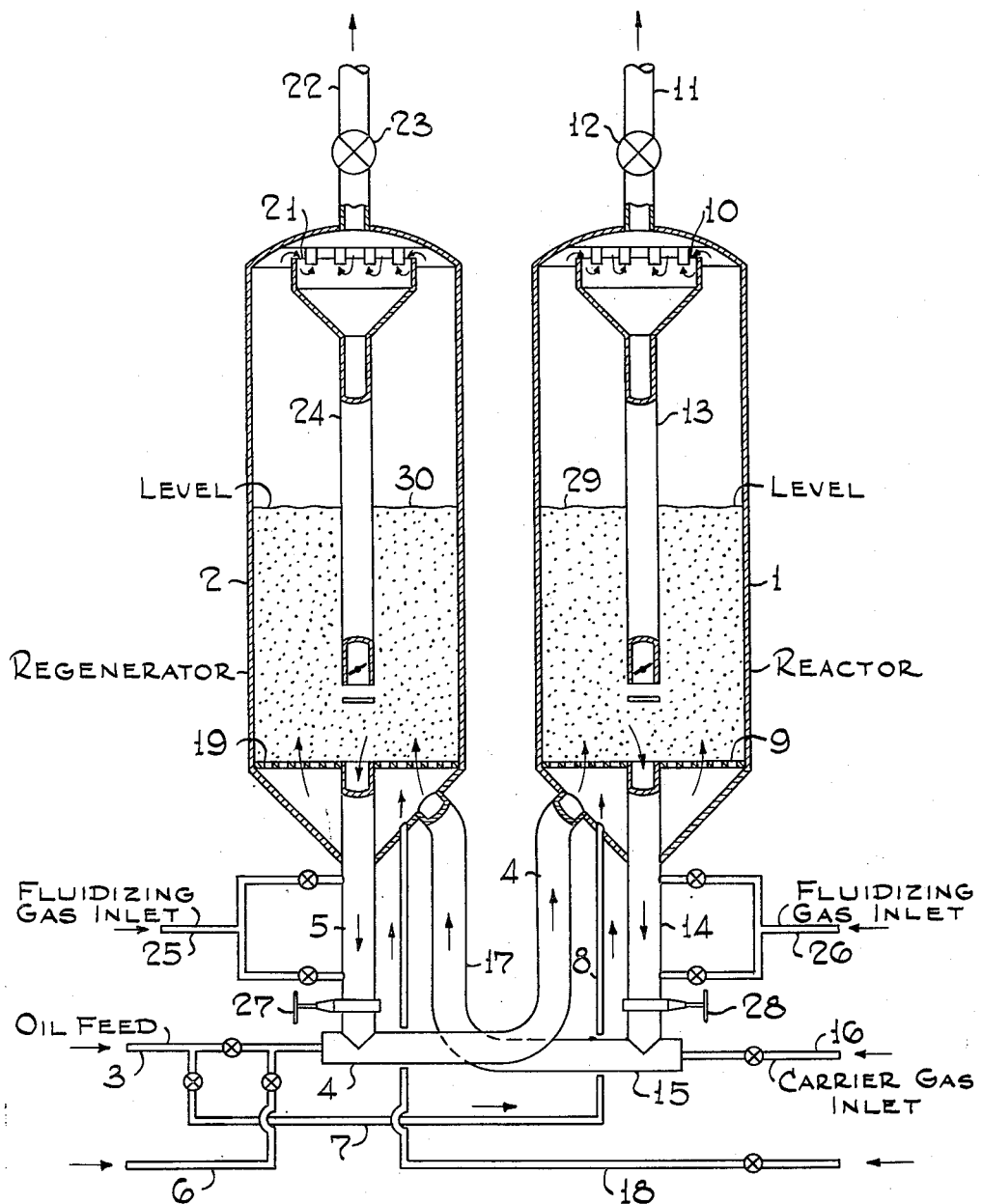
John C. Munday Inventor
By George J. Silhavy Attorney Patented Jan. 26, 1954

2,667,448

UNITED STATES PATENT OFFICE 2,667,448

HANDLING FINELY DIVIDED SOLIDS

John C. Munday, Cranford, N. J., assignor to Standard Oil Development Company, a corporation of Delaware Original application October 28, 1942, Serial No. 463,653. Divided and this application March 30, 1950, Serial No. 152,886

4 Claims. (Cl. 196—52)

This invention relates to processes involving the transfer of solid materials to and from a reaction or treating zone, or between two or more zones. It is especially concerned with processes wherein the solid material is in a finely divided form.

The invention is applicable to the treatment of solids, and to the treatment of gases with solids or in the presence of solids, and to reactions between solids. As examples of the many processes in which the invention finds application, the following are given: the distillation of oil from oil shale, the carbonization of coal, the roasting of ores, the reduction of metal oxides, the distillation of wood, the calcination of limestone, the production of cement, the conversion of hydrocarbons in the presence of catalytic or non-catalytic solids, the regeneration of solid catalysts or contact agents by burning, the evaporation of liquids, and the transfer of heat between fluid streams by means of solids.

One object of the invention is an improved method of controlling the transfer of solids to and from reaction or treating zones. Another object is an improved method of circulating solid material through a plurality of zones containing different gases or vapors while maintaining substantial isolation of the gases present in the zones. Another object of the invention is an improved moving powder process wherein structural steel requirements and mechanical control devices in contact with erosive moving powder are reduced to a minimum. Other objects will appear in the description of the process given below.

In carrying out the invention, the solid material is employed in a finely divided form, and is maintained in a freely-flowing state by the presence of an aerating or fluidizing gas. In this condition the finely divided solid behaves as a fluid and can be pumped or otherwise handled as a fluid in transferring it through the various steps of a process.

For example, the fluidized solid can be transferred by means of a mechanical device such as a screw rotating within a barrel, or a star feeder or a reciprocating piston. Another device for the handling of fluidized solids is the standpipe pump, wherein pressure is developed by the effect of gravity on a confined vertical column of fludized powder. In a simple form of the standpipe, the solid is carried to the top of the standpipe by means of a gas stream, the carrier gas is separated, and the solid is passed down the standpipe as a dense fluidized mass. The fluistatic pressure of the solid increases progressively with the distance from the top of the column, for example, at about one pound per square inch for each five feet of height when the fluidized solid has a density of about 28 pounds per cubic foot.

An important element of the invention resides in the control of the density of finely divided solids by varying the amount of fluidizing gas associated therewith. Since the fluistatic pressure is directly related to the density, the pressure developed at the bottom of a column of fluidized solid can be maintained as desired through the addition of the proper amount of fluidizing gas. For example, the pressure in a standpipe can be controlled in this manner so that solid flows from the standpipe into a reactor at the desired rate. Similarly, solid can be withdrawn from a reactor at the desired rate by controlling the density of the solid in the withdrawn stream.

A further important element which is necessary for the control of solid flow by the method of the present invention is the balancing of the pressure developed in standpipes against the other pressures in the system, for example, back pressure exerted from a reactor and gas pressure at the top of a standpipe.

The improved method is especially applicable to processes wherein a solid material is passed through a reaction zone from which air must be excluded, or through two or more reaction zones containing different gases which must be kept isolated from each other. For example, in the catalytic cracking of hydrocarbon oils, finely divided catalyst is passed first through a reaction zone wherein the oil is cracked and then through a regeneration zone wherein coky deposits on the catalysts are removed by burning with air. Much of the early development in the field of moving solids was concerned with methods for the prevention of "blowback" of gases from one zone to another.

In order to ensure a perfect seal between different reaction zones or between a reaction zone and the atmosphere, it has been customary in prior processes to provide a relatively high pressure drop on the powder passing from one zone to the other. In the case of a standpipe, the pressure drop is taken across a control valve situated at the standpipe outlet, and the existence of the pressure drop, as shown by manometers for example, is indication that the seal is adequate to prevent gas blowback. Commercial plants are designed to operate with a pressure drop across each control valve of about 5 pounds per square inch. Since one control valve is necessary for controlling the flow of catalyst to the reaction chamber and another for controlling the flow of catalyst to the regeneration chamber, the total pressure across both control valves amounts to 10 pounds per square inch.

The pressure drops across the control valves in many designs are as great or greater than those encountered in overcoming all other frictional resistances in the system. The expense necessary to build up pressure continuously on the finely divided powder to overcome the pressure drop across the control valves in large scale units in a substantial item. For example, a single large sized screw pump of alloy steel may cost several hundred thousand dollars; while in the case of the standpipe pump 50 feet of extra standpipe height may be necessary to provide a 10-pound pressure drop across control valves, which requires large amounts of structural steelwork in order to support high in the air the heavy equipment such as reactors, hoppers, standpipes and the finely divided solid contained therein. One of the principal objects of the present invention is to provide an improved process and apparatus which does not require the use of control valves for regulating the flow of solids through the circuit and which, therefore, materially reduces the amount of pressure which must be built up on the powder being circulated.

Having stated the general nature and objects, the invention will be better understood by reference to the accompanying drawing, in which the figure is a diagrammatic view of one form of apparatus forming a part of the present invention.

In the process, as illustrated in the figure, the hydrocarbon oil feed, either in liquid or vapor form, is introduced into the system through line 3. The oil feed may be passed into transfer line 4 where it mixes with hot, freshly regenerated catalyst discharged through line 4 into the bottom of reactor 1. In cases where liquid oil is used as feed, the temperature of the hot regenerated catalyst should be sufficient to vaporize a substantial amount of the oil and the amount of catalyst mixed with the oil should be sufficient to absorb completely any unvaporized oil so that the resulting mixture will be in the form of a relatively dry suspension of vapors and catalyst.

If desired, a portion or all of the oil feed may be passed from line 3 through lines 7 and 8 directly to the bottom of reactor 1, thus by-passing transfer line 4. In cases where all of the oil by-passes the transfer line 4, a carrier gas, such as steam or refinery gases, may be introduced into transfer line 4 through line 6. The density of the material passing through transfer line 4 may be controlled by adjusting the amount of gas or vapors and catalyst introduced into transfer line 4.

The mixture of oil vapors and catalyst introduced into the reactor 1 passes from the bottom of the reactor upwardly through a grid 9 which distributes the suspension over the whole cross-sectional area of the reaction zone into the main body of the reactor. Within the main body of the reactor, the velocity of the oil vapors is reduced so that the finely divided catalytic material tends to settle into a relatively dense mass which is maintained in a turbulent fluidized state by the upward passage of the oil vapors therethrough. When the velocity of the vapors passing upwardly through the catalyst mass is of the order of from 0.3 to 3.0 feet per second and when the powdered catalytic material is of the order of from 200 to 400 mesh, a mixture of catalyst and oil vapors within the reactor 1 separates into two sharply-defined phases, one a dense phase in the bottom section of the reactor having a definite upper level or meniscus and the other a dilute phase located above the dense phase. At higher gas velocities the level becomes less definite, and at still higher velocities disappears entirely. The dense phase in the preferred range of velocities has the appearance of a boiling liquid by reason of the passage therethrough of bubbles of gas or of solid-gas suspension, while above the level there is a suspension of solid in gas.

The zones containing the dense turbulent mass of catalytic material are sometimes called hindered settling zones to distinguish them from reaction zones wherein the catalytic material is carried in suspension by the gas passing therethrough. In the latter case, the catalytic material is not subjected to a turbulent churning action during passage through the reaction zone.

Due to the continuous churning of the solid in hindered settling zones, the temperature is practically constant throughout, even when highly endothermic or exothermic reactions are being carried out. A further advantage is the ease with which the temperature may be controlled in such reaction zones. For example, the temperature may be increased by the addition of a stream of hot fluidized solid or of hot gas, or it may be reduced by the addition of a stream of cool fluidized solid or cool gas or a cool vaporizable liquid. Despite the fact that the temperature of the hot or cold stream may be widely different from that of the reactor, the temperature in a hindered settling zone may vary throughout by no more than 5° or 10° F.

The density of the solid in hindered settling zones and the amount of solid carried out with the gas depend on a number of factors, such as the velocity of the vapors, the specific gravity of the solid, the size of the particles, the particle size range, the rates of solid addition and withdrawal, and the depth of the dilute phase in the upper portion of the reactor. The effect of these factors is easily determined for a given material, but as an example of the magnitude of the quantities involved it may be stated that when employing solid, the bulk of which is in the particle size range of from 200–400 mesh and having a bulk density when freely settled of about 35 to 80 pounds per cubic foot, the linear upward gas velocity through the reactor may be from 0.5 to 10.0 feet per second and the density of the dense phase in the reactor may be from 5 to 25 pounds per cubic foot. In general, in many processes the higher densities are preferred since higher capacities per unit volume are obtained thereby. The carry-over of solid, even of finely powdered solid, with the gas leaving the hindered settling zone may be very small if proper conditions are employed. For example, the carry-over may be of the order of a few thousandths of a pound per cubic foot if the gas velocity in the free settling space is low, such as one or two feet per second, and if a free settling space of from 5 to 15 feet is provided above the dense phase.

The oil vapors after passing upwardly through the turbulent mass of fluidized catalyst in the reactor 1 pass through multiclone separator 10 or other suitable separating device located in the top section of the reactor 1, wherein entrained catalyst is separated therefrom. Separated catalyst is returned to the reaction zone through pipe 13 which preferably dips below the level of dense fluidized powder in reaction zone 1.

The cracked vapors after passing through separator 10 are removed from the reactor 1 through line 11 having a control valve 12. The oil vapors withdrawn from the reactor 1 through line 11 are passed to suitable fractionating, separating and recovery equipment (not shown) for separating and recovering the desired products therefrom.

Catalytic material containing carbonaceous deposits formed during the cracking process is continuously withdrawn from the reaction chamber 1 through a vertical column or conduit 14 forming a standpipe. The catalytic material passing through the standpipe 14 discharges into a transfer line 15 wherein it intermixes with a carrier gas introduced through line 16. The carrier gas may be air or other oxidizing gas or it may be a relatively inert gas, such as steam, spent combustion gases or the like. The mixture of catalytic material and carrier gas is passed through transfer line 15 into a vertical leg 17 into the bottom portion of regenerator 2. Additional oxidizing gas may be introduced into the bottom section of the regenerator 2 through line 18. The density of the mixture of spent catalytic material and carrier gas passing upwardly through the vertical leg 17 may be controlled by regulating the amount of carrier gas passing into the transfer line 15 and the amount of gas passing through line 18.

The regenerator is preferably provided with a conical bottom section having a perforated grid plate 19 through which the suspension of catalyst and gas passes into the main body of the regenerating chamber. The regenerating chamber may be of the same construction and the velocity of the oxidizing gas passing therethrough may be controlled as described in connection with reaction chamber 1 so as to maintain a dense turbulent phase of catalytic material undergoing regeneration in the bottom portion of the regenerator superimposed by a dilute suspension of spent regenerating gas and entrained catalytic material. The spent combustion gases after passing through the regenerator 2 passes to a multiclone separator 21 or other suitable separating device for removing entrained catalytic material therefrom. After passing through the separator 21, the spent regenerating gas may be removed from the regenerator through line 22 having a control valve 23 and may be passed to further separating and heat recovery equipment which, for purposes of simplicity, have not been shown on the drawings. Catalytic material removed from the spent regenerating gas in the separator 21 may be returned to the regenerating chamber through line 24. Line 24 preferably terminates below the dense phase level of catalytic material therein.

Regenerated catalyst, which has been subjected to oxidizing treatment to remove carbonaceous deposits therefrom within regenerator 2, is continuously removed therefrom through a vertical column or standpipe 5 and discharged into the oil stream leading to the reaction chamber 1, as previously described.

The catalyst in the standpipes 5 and 14 should be maintained in a freely flowing fluidized state to build up fluistatic pressure at the bottom thereof. In many cases it is desirable to introduce a fluidizing gas through lines 25 and 26 into standpipes 5 and 14, respectively. The fluidizing gas may be air or hydrocarbon or an inert gas such as nitrogen, steam or flue gas, and it may be introduced at one or more points in the standpipe. The density of the catalyst in the standpipes and the fluistatic pressure developed therein are controlled by the amount of fluidizing gas introduced. Valve 27 in standpipe 5 and valve 28 in standpipe 14 may be provided for safety purposes. These valves may be operated automatically by instruments designed to indicate unbalance in the system to an extreme degree, for example, in the gas pressures above the catalyst levels 29 in reactor 1 and 30 in regenerator 2, or in the levels themselves.

The circulation of catalytic material from the regeneration chamber 2 to the reaction chamber 1 is caused by difference in pressure on the catalytic material at the base of the standpipe 5 and the inlet pressure on the material passing through the transfer line 4.

The total pressure at the base of the standpipe 5 is, in turn, equal to the sum of the fluistatic pressures developed by the standpipe 5 and by the dense layer of catalytic material within the reaction chamber 1 above the standpipe and the back pressures on the regeneration gas in the upper portion of the chamber 2 above the level of the dense, fluidized mass.

The pressure on the material passing through the transfer line 4 must, in turn, be sufficient to overcome the pressure drop through the transfer line 4, the pressure drop across the grid 9 the fluistatic pressure developed by the dense, fluidized mass of catalytic material within the reaction chamber 1, and the back pressure on the oil vapors in the upper portion of the reaction chamber. The pressure drop through the transfer line 4 may be regulated within limits by controlling the density of the suspension passing therethrough. In other words, increasing the density of the suspension increases the pressure drop.

The circulation of catalytic material from the chamber 1 to the regeneration chamber 2 is accomplished in the reverse manner. In order to circulate catalytic material from one chamber to the other, it is therefore essential that the total pressure at the base of the standpipes be slightly greater than the pressure at the inlet of the transfer line, and the rate of circulation depends directly on the standpipe and transfer line pressure differential. By increasing the pressure differential, the flow may be increased and by decreasing, the flow may be decreased.

The total pressure at the base of the standpipe 5 or 14 may be varied by any one or more of the following ways: first, by changing the back pressure on the gases in the upper portion of the reaction chamber; second, by changing the density of the layer of fluidized solids within the reaction or regenerating chamber above the standpipe; and third, by changing the amount of fluistatic pressure developed by the standpipes 5 and 14. The latter may be accomplished by varying the amount of fluidizing gas introduced into the standpipe through lines 25 and 26.

The pressure at the inlet of the transfer line, on the other hand, may be varied in the following ways: first, by changing the density of the catalyst-gas mixture passing through the transfer line. This may be done by changing the relative proportions of oil passing through transfer line 4 and by-pass line 7 or the relative proportions of regenerating gas passing through transfer line 15 and by-pass line 18; second, by reducing the fluistatic pressure developed at the base of the fluidized layer of solid material into which the transfer line discharges. This may be done by reducing the level or the density of the fluidized mass within the latter chamber; third, by reducing the pressure in the chamber in which the transfer line discharges.

It will be apparent from the above that a number of different variables may be utilized for controlling the flow of catalytic material through the chambers without the use of control valves. In general, it is preferred to control the rate of flow through the circuit previously described by varying the density within the standpipes.

Similarly the relative amount of catalytic material in the reaction and regenerating zones may be controlled. For illustrative purposes, the figure in the drawing shows the dense phase catalytic material in the regenerator on the same level as that in the reaction chamber. If it is desired to increase the amount of catalytic material in the reactor or decrease that in the regenerator, the circulation of catalyst from the regenerator to the reaction chamber may be increased by increasing the back pressure on the regeneration gases, increasing the pressure developed by the standpipe 5 by reducing the amount of fluidizing gas introduced through line 25, and by increasing the amount of oil vapors passing through the transfer line to thereby reduce the pressure drop through the transfer line 4 or by a combination of these factors. Under such conditions the catalytic material will flow from the regenerator to the reaction chamber at a faster rate than it will flow from the reaction chamber to the regenerator until the level of dense fluidized mass of catalytic material in reaction chamber has been raised to such a point that the additional fluistatic pressure developed at the base of the fluidized mass within the reaction chamber equals the change in pressure on the regenerator side of the circuit. At this point, equilibrium is again reached and the catalyst flows from one chamber to the other and back at the same rate.

The present invention proposes to regulate the rate of flow through the circuit and the amount of catalyst contained in the separate treating zones by varying the ratio of solid material to gas in the various parts of the circuit above described rather than by employing control valves.

This case is filed as a division of my copending application Serial Number 463,653, filed October 28, 1942, now Patent No. 2,539,263, on "Handling Finely Divided Solids."

Having described the preferred embodiment of the invention, it will be understood that it embraces such other variations and modifications as come within the spirit and scope thereof.

What I claim:

1. The method of transferring a finely divided fluidized solid continuously from one of two contacting chambers containing separate gaseous atmospheres to the other and back again in a closed cycle, which comprises withdrawing a dense column of fluidized solid downward from the bottom portion of each of said contacting zones through an unrestricted open standpipe in which the fluistatic pressure of the column of solid creates at the bottom of each of said standpipes a high pressure zone wherein the pressure is greater than the pressure at the bottom of either of said contacting chambers, passing the solid from each of said high pressure zones upward through an external transfer line communicating therewith and leading to the bottom portion of the other contacting chamber, and controlling the concentration of solids in said transfer lines to regulate the flow of solids between said chambers while maintaining the total fluistatic pressure head on the solid at the bottom of each standpipe greater than the total fluistatic pressure head on the solid in the transfer line communicating therewith, said high pressure zones below the level of both contacting zones providing a positive means of preventing the inadvertent back-mixing of the atmosphere in either of said contacting zones into the other.

2. The method of claim 1, wherein the gaseous atmosphere contained in each of said contacting zones is introduced into the bottom portion thereof, at a level near the point of entry of the transfer line leading upward thereto from the other contacting vessel.

3. The method of claim 1, wherein one contacting zone contains a hydrocarbon conversion catalyst in an atmosphere of hydrocarbon undergoing conversion, and the second contacting zone contains spent catalyst undergoing regeneration in an atmosphere of oxidizing gas adapted to burn off carbonaceous deposits formed on the catalyst during the conversion reaction.

4. The method of transferring a finely divided fluidized solid continuously from one of two contacting zones containing separate gaseous atmospheres to the other and back again in a closed cycle, which comprises withdrawing a dense column of fluidized solid downward from each of said contacting zones through an unrestricted open standpipe in which the fluistatic pressure of the column of solid creates at the bottom of each of said standpipes a high pressure zone wherein the pressure is greater than the pressure at the bottom of either of said contacting zones, passing the solid from each of said high pressure zones through a transfer line communicating therewith and leading upward into the other contacting zone, and controlling the rate of circulation of the solid between the two contacting zones by varying the density of the fluidized mixture of solid and gas in at least one of said transfer lines, said high pressure zones below the level of both contacting zones providing a positive means of preventing the inadvertent back-mixing of the atmosphere in either of said contacting zones into the other.

JOHN C. MUNDAY.

References Cited in the file of this patent

UNITED STATES PATENTS

| Number | Name | Date |
|---|---|---|
| 2,361,978 | Swearingen | Nov. 7, 1944 |
| 2,464,812 | Johnson | Mar. 22, 1949 |
| 2,488,029 | Scheineman | Nov. 15, 1949 |
| 2,488,030 | Scheineman | Nov. 15, 1949 |
| 2,539,263 | Munday | Jan. 23, 1951 |